United States Patent
Maxted (10) Patent No.: US 8,099,777 B1
(45) Date of Patent: Jan. 17, 2012

(54) HIGH SECURITY, MULTI-LEVEL PROCESSOR AND METHOD OF OPERATING A COMPUTING SYSTEM

(75) Inventor: James C. Maxted, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2072 days.

(21) Appl. No.: 10/927,330

(22) Filed: Aug. 26, 2004

(51) Int. Cl.
- G06F 7/04 (2006.01)
- G06F 15/16 (2006.01)
- G06F 17/30 (2006.01)
- H04L 29/06 (2006.01)

(52) U.S. Cl. ........................................................ 726/14
(58) Field of Classification Search ...................... 726/14
See application file for complete search history.

(56) References Cited

U.S. PATENT DOCUMENTS

| | | | |
|---|---|---|---|
| 4,511,961 A * | 4/1985 | Penton | 711/201 |
| 2003/0152084 A1* | 8/2003 | Lee et al. | 370/395.21 |
| 2004/0073778 A1* | 4/2004 | Adiletta et al. | 712/220 |

FOREIGN PATENT DOCUMENTS

GB    EP 0268342    * 5/1988

* cited by examiner

*Primary Examiner* — Kambiz Zand
*Assistant Examiner* — Aubrey Wyszynski
(74) *Attorney, Agent, or Firm* — Donna P. Suchy; Daniel M. Barbieri (57) ABSTRACT

A computing system can be optimized for high security, reliability and/or integrity. The computing system can include a multiple instruction stream, single data stream processor. The multiple instruction stream, single data stream processor can include a master instruction processing unit, fetch instruction processing units, a single bus interface/memory unit, and a single data processing unit. The computing system can also include a storage device or a memory. The processor can be utilized in numerous applications including avionics software applications.

20 Claims, 6 Drawing Sheets

HIGH SECURITY, MULTI-LEVEL PROCESSOR AND METHOD OF OPERATING A COMPUTING SYSTEM

FIELD OF THE INVENTION

The present invention relates to computer systems. More particularly, the present invention relates to a computer system optimized for at least one of security, integrity, and reliability.

BACKGROUND OF THE INVENTION

Computer systems typically include at least one processor and at least one storage device. Michael Flynn, an American electrical engineer, distinguished four classes of processor architectures in 1966. The four classes include: single instruction stream, single data stream (SISD), multiple instruction stream, single data stream (MISD), single instruction stream, multiple data stream (SIMD), and multiple instruction stream, multiple data stream (MIMD). All of the above architectures have commercial implementations except for the MISD architecture.

Various computer applications require high levels of information security, reliability, and/or integrity. Security requires that non-secure resources cannot access secure data. Reliability and integrity requires that accurate operations of each routine is maintained as multiple routines are performed. For example, computing systems operating in the areas of national security, finance, avionics, defense, etc. require computers that do not allow the intentional or accidental corruption of data, the inappropriate modification of data, or unauthorized viewing of data.

When executing a single application or multiple applications, the microprocessor may simultaneously execute multiple threads of a program. A thread is a sequence of code within a program or a software routine. The execution of multiple threads increases the unpredictability of the computing system and the process.

In conventional computer systems, integrity and reliability can be adversely affected when multiple execution threads are running in a particular process. One thread can consume a large number of processing resources or processing time, thereby limiting the amount of processing resources and processing time that can be devoted to other threads. Such a situation can prevent other threads from being completed in accordance with necessary reliability and integrity requirements.

To increase computing efficiency, computer systems often utilize multiple processing techniques which execute two or more applications (i.e., software programs) simultaneously on a single microprocessor. The single microprocessor often includes multiple, integrated execution units. Conventionally, it is difficult to execute multiple applications on a single processor and yet be able to guarantee data security, reliability and integrity.

One conventional computing technique for increasing security, integrity and reliability is to provide a computer system that utilizes a restricted single processor. The restricted single processor is restricted to executing a single program.

In such a conventional computer system, the restricted single processor includes processing resources such as a CPU, memory, and an input/output (I/O). Each processing resource is designed to communicate with other processing resources on non-interfering basis. Techniques, such as, processor-initiated direct memory access (DMA) are not generally allowed in the interests of security, integrity and reliability.

Such a conventional technique is an inefficient usage of processing capability because many applications are non-complex and the abilities of the processing resources are effectively wasted. Further, this technique requires more processors, memory devices, etc. to perform the same tasks which in turn require larger power consumption and larger sizes. Such conventional techniques are less desirable in situations such as embedded applications where smaller power consumption, size and weight are a significant design consideration.

Other conventional computing systems have utilized ring protective resources (a security ring architecture). A security ring architecture can utilize memory mapping and increased levels of security for each process. Priority, capabilities, and access are given to each process depending upon its required security or level of confidence. However, such systems still cannot guarantee inadvertent access to secured data.

Ensuring system security in a conventional system using ring protective resources is difficult. This difficulty is increased under exceptional conditions, such as, memory protection faults, interrupts, exceptions, and other conditions. For example, a high priority process could eliminate other processes from executing. A lower priority process could be prevented from executing if one of the processing resources operates other than as predicted and/or consumes a large amount of processing time, or other resources.

Thus, there is a need for a processor architecture that provides greater security, reliability, and integrity and is low cost, efficient, and compact. Further still, there is a need for a processor architecture optimized for at least one of security, integrity, and reliability. Further still, there is a need for a secure, highly reliable embedded processing system. Further, there is a need for a non-conventional processor architecture optimized for at least one of security, integrity, or reliability.

SUMMARY OF THE INVENTION

An exemplary embodiment relates to a computing system optimized for high security, reliability, or integrity. The computing system includes a multiple instruction stream, single data stream processor including a master instruction processing unit, a plurality of fetch instruction processing units, a single bus interface/memory unit, and a single data processing unit. The computing system can also include a memory and input/output interface devices.

Another exemplary embodiment relates to an apparatus for use in a computing system optimized for high security, reliability, or integrity. The apparatus includes a supervisor fetch unit, a plurality of fetch instruction processing units, a single bus interface/memory unit, and a single data processing unit.

Still another exemplary embodiment relates to a method of operating a computer system. The method includes configuring memory with a supervisory fetch unit. The memory is configured so that a first fetch instruction unit has access to a selected range in the memory and a second instruction fetch unit has access to a second range in the memory unit. The method further includes fetching a first instruction with the first fetch instruction unit in a first time slot, performing the first instruction using a single bus interface/memory unit, and/or a single data processing unit in the first time slot. The method also includes fetching a second instruction in a second time slot with the second instruction fetch unit, and performing the instruction using the single bus interface/memory unit or the single data processing unit in the second time slot.

BRIEF DESCRIPTION OF THE DRAWINGS

The preferred exemplary embodiments are hereinafter described with reference to the accompanying drawings, wherein like numerals denote like elements, and.

DETAILED DESCRIPTION OF THE PREFERRED EMBODIMENTS

Figure 1:
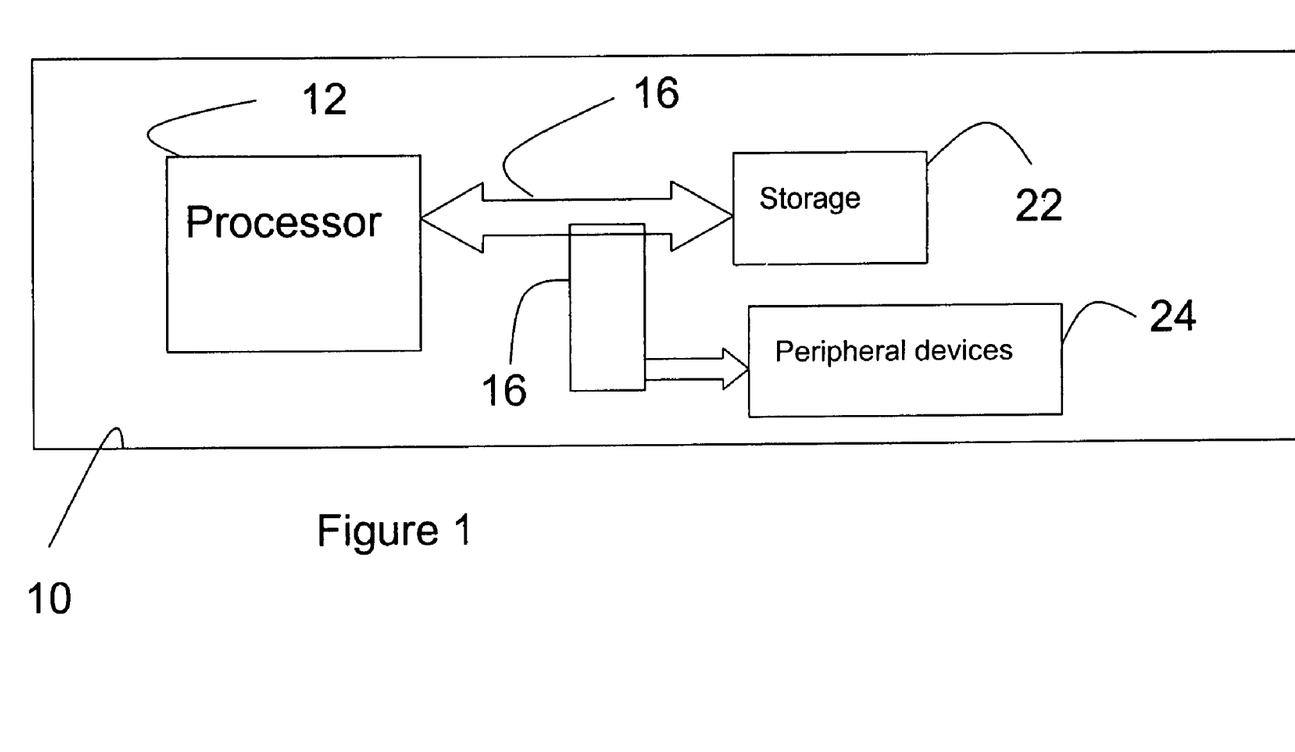
FIG. 1 is a general schematic block diagram of a computer system including a processor and a memory in accordance with an exemplary embodiment of the present invention.

With reference to FIG. 1, a computer system 10 includes a processor 12, a storage unit 22, and peripheral devices 24. Processor 12 is coupled to storage unit 22 via a system bus 16. Advantageously, processor 12 is preferably a multiple instruction stream, single data stream (MISD) processor.

Storage unit 22 can be an internal or external memory. Unit 22 is preferably a system memory implemented as a DRAM, SRAM, FlashProm, or other electronic storage device. Alternatively, storage unit 22 can include disk drives, or other storage media.

Peripheral devices 24 can be any devices which can be coupled to system bus 16. System bus 16 is preferably a parallel data-type bus. Devices 24 can include communication devices, display devices, user interfaces, etc.

Computer system 10 is preferably configured to execute at least one highly secure, embedded processing application such as those used in avionics systems. Processor 12 having MSID architecture allows each instruction stream or thread to appear to be executing on its own machine with its own local memory space and yet allows system 10 to be provided in a physically small, relatively low power, and inexpensive implementation. Preferably, system 10 appears as a single processor memory/communication system.

In a preferred embodiment, computer system 10 meets many of the following operational principles:

1. System 10 is capable of hosting multiple, independent software processes. Each process appears to be executing on a single stand-alone processor within processor 12. Processes are not allowed access to memory locations of other processes. Processes are also not allowed to modify memory locations of other processes. Further, processes are not allowed to affect the behavior of any other process in any unplanned or inadvertent manner. Effectively from the individual process standpoint, the process that is currently executing appears to have complete and total control of system 10.
2. System 10 establishes the allocation of system memory (e.g., unit 22) to processes. Preferably, a supervisor unit within processor 12 allocates system memory. Process memory requirements can vary greatly. The correct memory type and size to each process is allocated in a configurable manner.
3. System 10 initializes each process, preferably via the supervisor unit within processor 12. All processes in system 10 are started in a predictable fashion. Also, recovery from memory access failures, process exceptions, halts, time-outs, etc. occur in a predictable fashion.
4. System 10 allows interprocess communication. Processes executed in system 10 are capable of passing information from process to process via a message send/receive structure or via a portion of system memory which is allocated to multiple processes and is therefore shared by all allocated processes. One of the main considerations is that the processes do not interfere with each other in an unplanned manner.
5. System 10 provides a guaranteed minimum process execution time within the system execution cycle. A highly reliable system preferably ensures that all processes execute under all expected conditions.
6. System 10 maps external system signals to an assigned process. This allows the connection of an external signal such as an interrupt to the process that services the interrupt. This provides the ability of providing interrupt driven I/O without the possibility of the interrupt service routine (ISR) acting in an unpredictable fashion and consuming all processing time.
7. One process in processor 12 shall be designated the SUPERVISOR process. The SUPERVISOR process is preferably executed on a supervisor unit within processor 12. The SUPERVISOR process begins execution at system reset and is responsible for the configuration of the rest of system 10. As such, the SUPERVISOR process has the greatest access to system 10 and should be developed under DO-178B, level A guidelines of the Federal Aviation Administration (FAA) and to the highest security level of system 10.
8. The remaining processes in processor 12 are designated as USER processes. The USER processes are executed on separate non-supervisor units within processor 12. All USER processes are initialized and begin execution under the direction by the SUPERVISOR process. Note that a USER process designation does not mean that the process execution is not secure.
9. The SUPERVISOR process has access to all USER process memory spaces, both instruction and data. The SUPERVISOR process has access to the USER processor memory space and is able to verify that the USER memory space is verifiable prior to starting the USER process. In addition, the SUPERVISOR process is also be responsible for reprogramming system 10.
10. The USER process has access to its locally designated address space. The restriction of USER process access to only its designated address space provides the process isolation needed for high security and high reliability processing. This does not mean that processes cannot share memory. The ability of processes to share program memory allows the system to utilize common software libraries and the ability to share data memory provides one method of process to process communication. The system memory partitioning and process allocation preferably takes into account the level of system security needed.

11. The SUPERVISOR process is capable of establishing the address space for each USER process. The ability of mapping the total system physical address space to the various USER process address spaces allows system 10 to best utilize the varying process memory requirements. The allocation of a portion of physical memory (e.g., unit 22) to multiple processes permits multiple processes access to common software library functions as well as providing a method of process to process communications via shared (or dual port) memory. Each memory allocation for a USER process is designated as read-only, write-only, or read-write.

12. System 10 provides a method for USER-process requested controlled termination of all process. The USER process termination request can be execution of an EXIT statement. Once terminated, the USER process may be reinitiated or the resources reallocated and a new process started.

13. System 10 provides a method for the SUPERVISOR process to request the immediate termination of any or all USER processes. The SUPERVISOR process can quickly shut down the entire system (i.e., eminent power failure). This may be accomplished by initially signaling the USER processes to shut-down. If processes are still running after a time-out period, they can be immediately terminated.

14. System 10 provides a method for the SUPERVISOR process to be notified of any exceptional USER process condition such as memory protection faults. The SUPERVISOR process can then take appropriate action to handle the signaled condition.

The above operational principles are design guidelines. The principles are provided to better understand exemplary embodiments of the present invention. The principles are not provided in a limiting fashion unless specifically recited in the claims.

Conventional systems can be implemented according to the operational principles described above utilizing a single instruction stream, single data stream CPU. A computer system using a Pentium® processor manufactured by Intel Corporation or a Power PC® processor can be utilized. Such a system can further add a real-time time, multitasking, interrupt driven OS to implement the scheduling, resource allocation, etc. However, such a conventional system suffers from the following deficiencies:

(1) Lack of design traceablility for commercial off-the-shelf (COTS) hardware that can produce latent defects, (2) Inherent complexity of the operating system which makes verification of the operating system design under all possible conditions virtually impossible, and (3) Lack of unified approach to system security which is required to ensure that intentional or accidental security boundary breaches cannot occur.

Conventional implementations which overcome some of these disadvantages tend to be large in terms of size, weight, consume large power and have greater costs. Further, these systems cannot meet the needs of embedded applications at this time.

Preferably, computer system 10 is utilized in an embedded avionics application (although system 10 can be utilized in any number of diverse applications). Processor 12 and computer system 10 can be implemented using Rockwell Collins Advanced Architecture Micro-Processor (AAMP) architecture and modifications thereof. Avionics applications include global positioning system SASSM (Selective Availability Anti-Spoofing Module), encryption/decryption key processing, avionics level A applications, etc. The present invention is not limited to any particular application unless explicitly recited in the claims.

Figure 2:
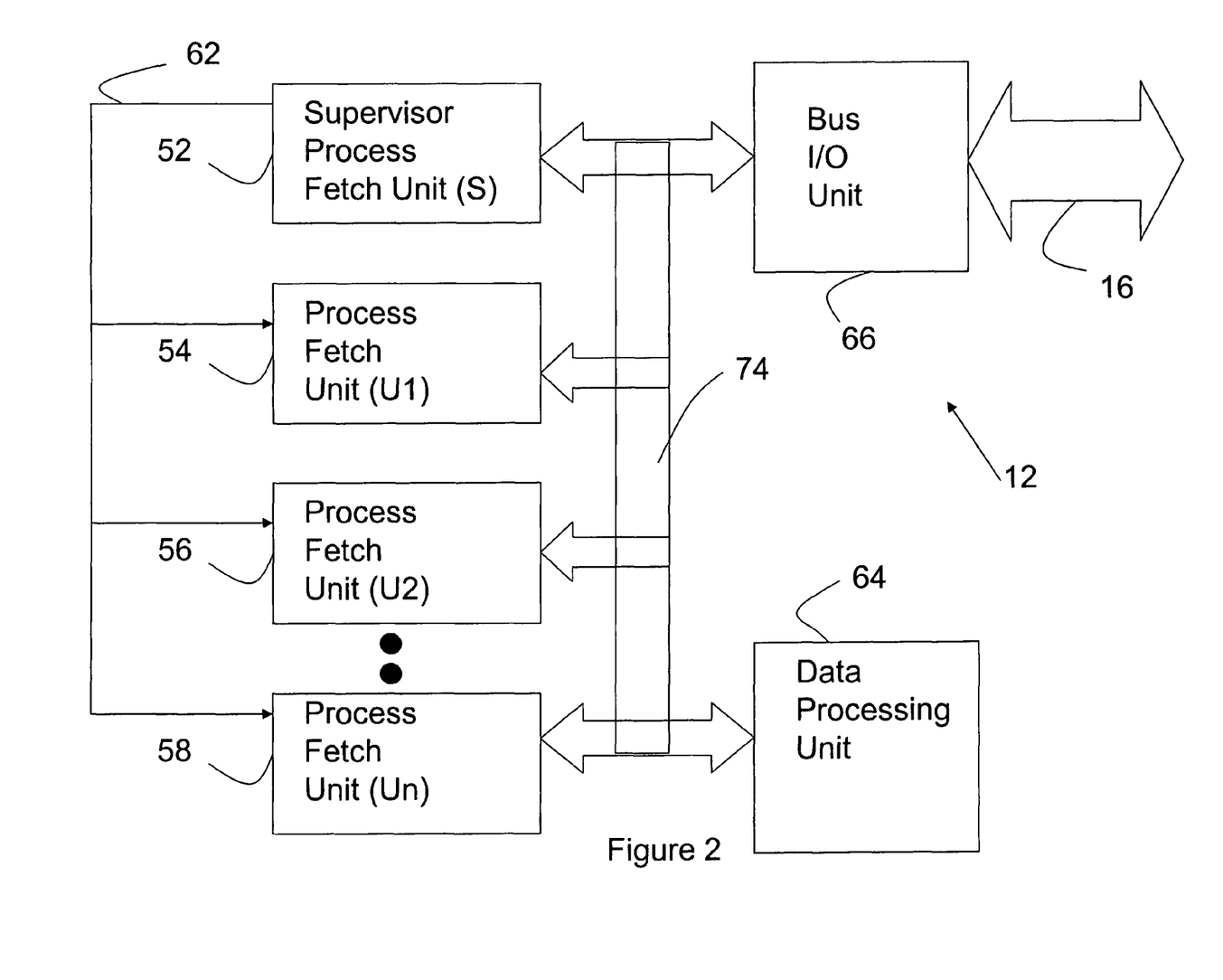
FIG. 2 is a more detailed schematic block diagram of the processor including a supervisor process fetch unit and a number of non-supervisor process fetch units illustrated in FIG. 1 in accordance with another exemplary embodiment of the present invention.

With reference to FIG. 2, processor 12 includes a master process fetch unit or supervisor process fetch unit 52, bus I/O unit 66, and a data processing unit 64. A set of user process fetch units or non-supervisor process fetch units 54-58 are also provided. Although only three units 54-58 are shown in FIG. 2, processor 12 can have any number of additional non-supervisor process fetch units. Units 54, 56, and 58 can also be referred to as user fetch units, instruction fetch units, instruction fetch processing units, or instruction processing units. Unit 52 can also be referred to as a supervisor fetch unit or master instruction processing unit. Unit 52 can also be referred to as a supervisor fetch unit or master instruction processing unit.

Bus I/O unit 66 can be any device which provides communication to a bus such as system bus 16 that provides a hardware interface for processor 12 with bus 16. Bus I/O unit 66 preferably executes read and write (store) instructions for processor 12. Bus I/O unit 66 can be any I/O controller that provides a hardware interface for processor 12 with bus 16. Bus I/O unit 66 can monitor operations and can perform tasks related to receiving input and transferring output, thereby providing processor 12 with a consistent means of communication with external devices such as peripheral devices and storage unit 22.

Data processing unit 64 can be any device for processing data including an ALU, shift register, or any hardware/microcode for performing data manipulations. Unit 64 can include the necessary hardware for actual instruction execution, including the fetching and manipulation of operands and results. Unit 64 can be a pipelined unit (although a non-pipelined unit is preferred). Unit 64 can include one or more integer processing units, floating point units, multiply/accumulate units, etc. Unit 64 can include shift registers, registers, logic gates, etc. Unit 64 can operate according to microcode. Unit 64 can include similar hardware to that used in the execution units of Pentium® processors.

Advantageously, processor 12 has an architecture in which actual data processing hardware is shared among all processes executing within processor 12. Multiple fetch units replicate primary structures within processor 12 related to the instruction stream. Such primary structures include at least one program counter, all temporary registers, registers for interrupt processing, etc. Unit 52 can serve as a master processor (effectively acting more like a conventional processor having a single instruction fetch unit and a single execution unit).

Units 52, 54, 56 and 58 are coupled to bus I/O unit 66 and data processing unit 64 by an internal bus 74. Preferably, processor 12 is integrated on one or more semiconductor substrates and is housed within a single IC package. Bus I/O unit 66 is coupled to system bus 16 and provides an interface for processor 12 to communicate with storage device 22 and peripheral devices 24 (FIG. 1). Supervisor process fetch unit 52 is coupled to fetch unit 54, fetch unit 56 and fetch unit 58 via a bus 62. Preferably, bus 62 operates to provide scheduling and enabling information from unit 52 to units 54, 56, and 58.

Advantageously, processor 12 preferably includes a dedicated fetch unit such as fetch unit 54, 56 or 58 for each instruction stream or thread. A process, subprocess, routine, etc., can be operated on each of units 52, 54, 56, and 58. Processor 12 can operate in a round-robin mode. Alternatively, processor 12 can operate in a priority time slice or interrupt driven process. Each thread is preferably limited in its execution time. Once the execution time expires, the next thread is executed.

In the round robin mode, supervisor processor unit 52 through bus 62 activates each of units 54, 56, and 58 in a round robin order, thereby providing a fixed time slice for each of processor 54, 56, and 58 to execute its instruction. Each of units 54, 56, and 58 executes a separate, distinct instruction fetch unit (e.g., has virtual independence in processor 12). For example, each unit 52 could host its own operating system, such as Windows® operating system. When a specific unit 54, 56, or 58 is active, it has exclusive use of unit 66 and unit 64 (e.g., the processor resources). Therefore, during a particular time slot, unit 54, 56, or 58 operates essentially like a single instruction stream, single data stream machine.

Before the next time slice (such as a clock cycle), the current unit 54, 56, and 58 completes its instruction and its operation is suspended. At the next time slot, the next unit 54, 56, or 58 is activated. Execution of the next unit 54, 56, or 58 is resumed at the point at which it was last suspended.

Preferably, each of units 54, 56, and 58 include internal registers for storing data associated with its process. For example, each unit 54, 56, and 58 includes temporary data registers, status registers, accumulators, program counters, exception processing registers, etc., for storing the state of data from its last active cycle. Preferably, units 52, 54, 56, and 58 include registers for storing any data needed for operation after the unit is reactivated.

Figure 3:
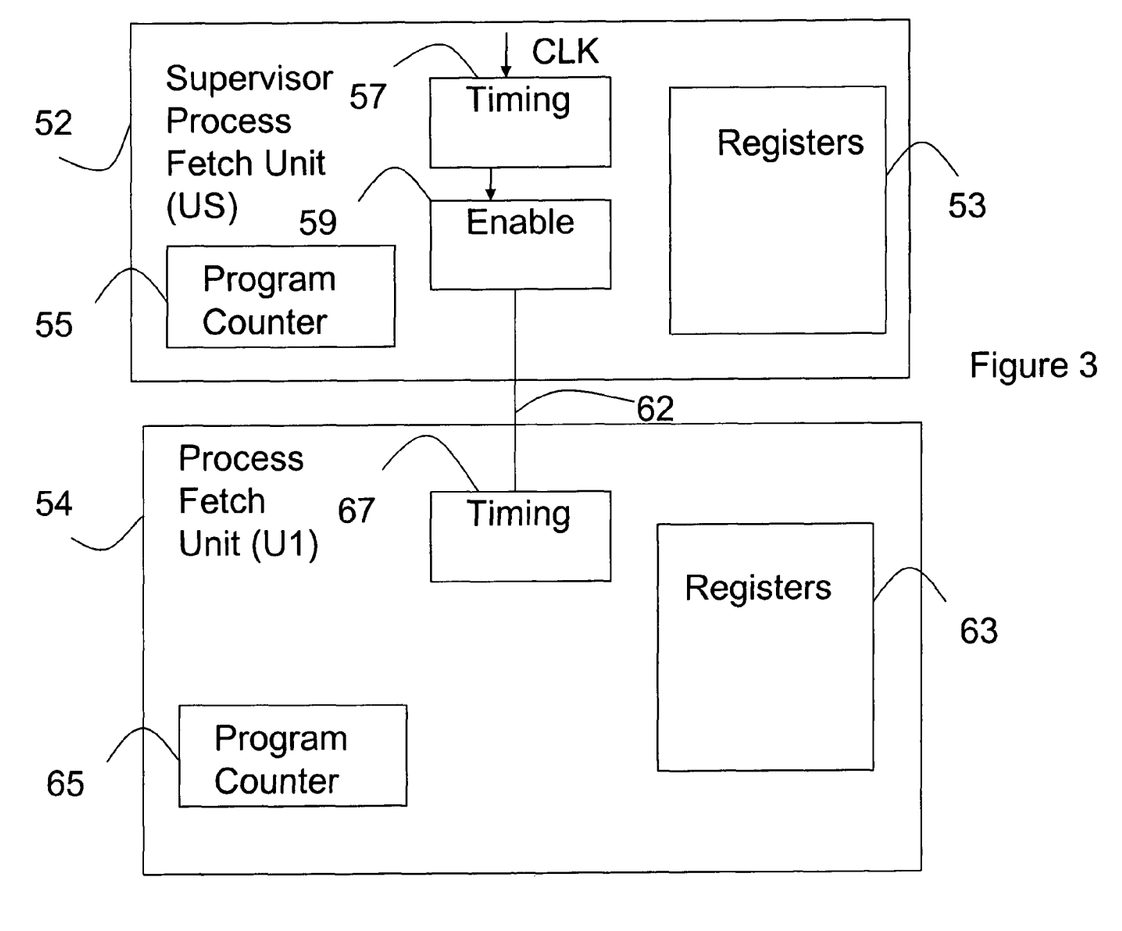
FIG. 3 is a more detailed block diagram of the supervisor process fetch unit and one of the non-supervisor process fetch unit illustrated in FIG. 2 in accordance with yet another exemplary embodiment of the present invention.

With reference to FIG. 3, supervisor fetch unit 54 includes a timing circuit 57, an enable circuit 59, a program counter 55 and registers 53. Non-supervisor fetch unit 54 includes a timing circuit 67, registers 63, and a program counter 65. Units 56 and 58 have similar architecture to unit 54. Timing circuit 57 receives a master clock signal and enable circuit 59 receives timing data and clock signals from circuit 57 and enables units 54, 56, and 58 as explained below via conductors on bus 62. Timing circuit 67 responds to enable signals on bus 62 to ensure appropriate activation and de-activation of unit 54.

Unlike conventional SISD architecture in which the data processing unit typically contains the internal data storage registers of the CPU, units 52 and 54 each include their own data storage registers such as registers 53 and 63. Registers 53 and 63 store data associated with the use of unit 66 and unit 64.

Units 52 and 54 also include program counters 55 and 65, respectively. Program counters 55 and 65 store the next instruction in the thread or stream of instructions for the particular unit. The storage of internal data in storage registers 53 and 63 is necessary as each unit 52 or 54 is activated and de-activated so that each unit 52 or 54 internally maintains its data as it is activated and de-activated.

Units 52 and 54 can be fabricated from registers, logic gates, pass gates, and clock circuitry similar to those used on conventional processors such as, on the instruction fetch units of Pentium® processors, manufactured by Intel Corporation. Units 52 and 54 can also operate with the assistance of microcode.

Figure 4:
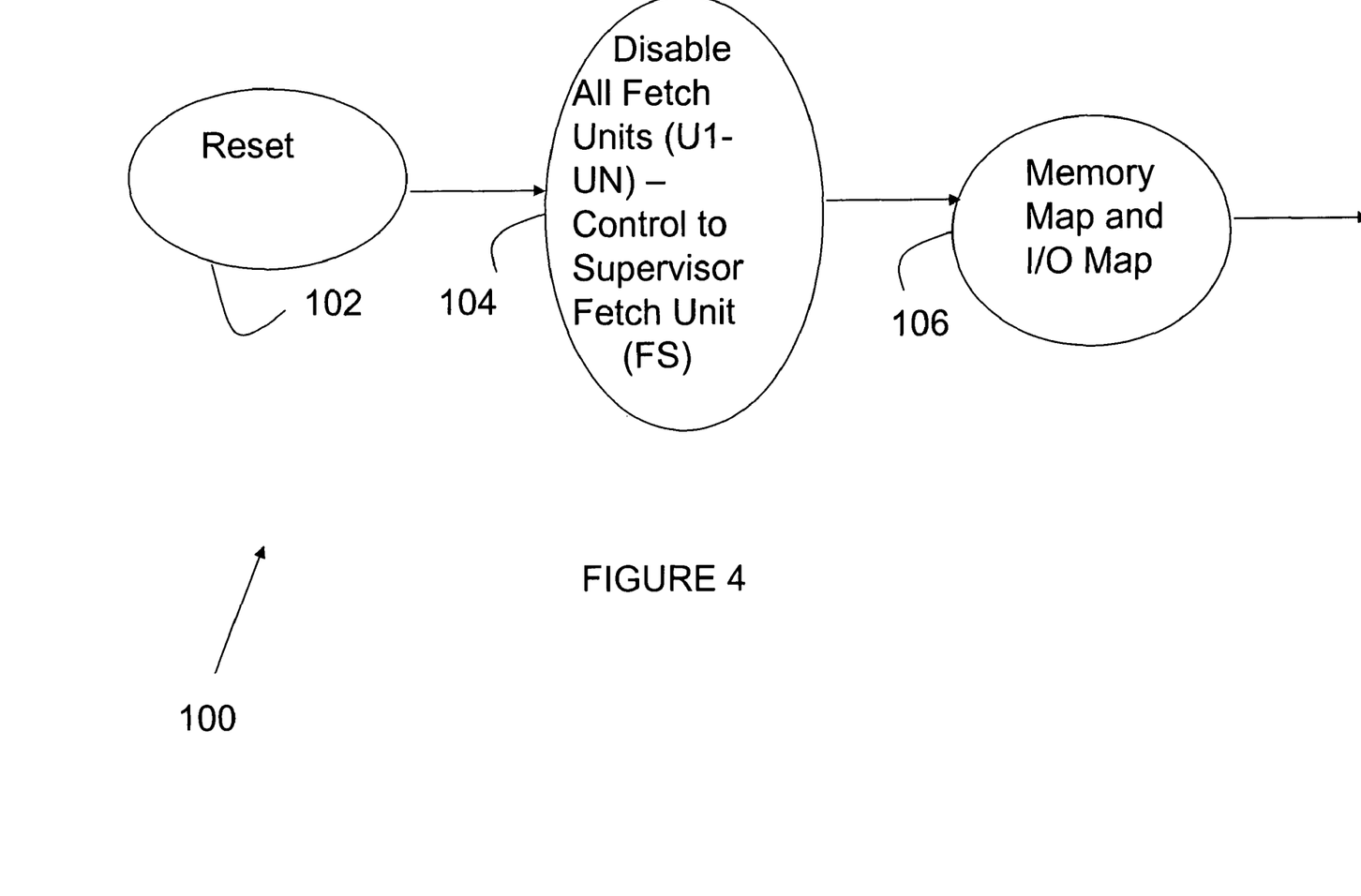
FIG. 4 is a flow diagram for the computing system illustrated in FIG. 1 in accordance with still another exemplary embodiment of the present invention.
Figure 5:
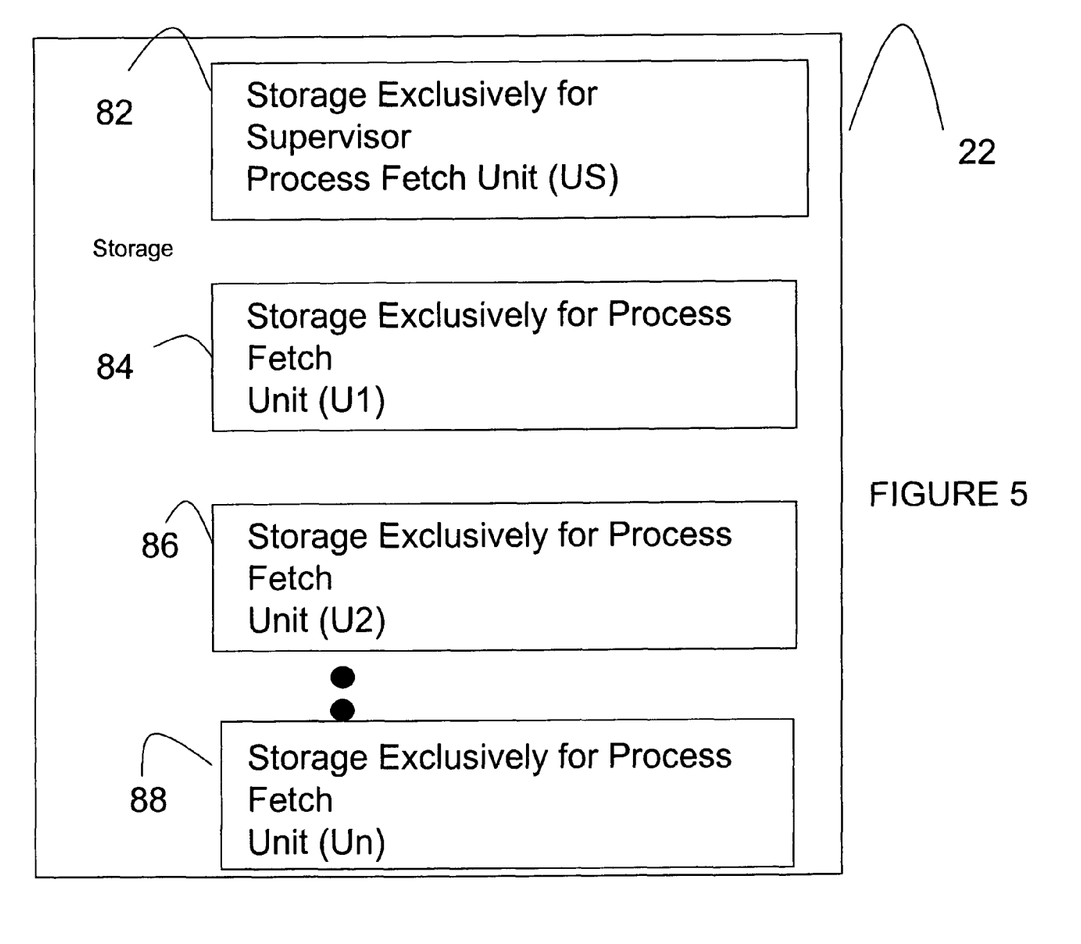
FIG. 5 is a more detailed block diagram of the memory illustrated in FIG. 1 showing memory mapping in accordance with yet still another exemplary embodiment of the present invention.

With reference to FIG. 4, an interrupt or reset condition causes all USER fetch units 54-58 to be disabled and the SUPERVISOR fetch unit 52 to be enabled in accordance with an operation 100. Reset state 102 can be an interrupt, a power on reset, an exception, or any signal which causes processor 12 to leave its ordinary course of operation.

Upon reset or interrupt, supervisory fetch unit 52 takes control of processor 12 in a reset state 104. Unit 52 sets up memory maps and I/O maps for system 10 in storage unit 22 in a state 106. Once unit 52 sets up storage unit 22 and initializes units 54, 56, and 58, separate threads can be executed on processor 12. Unit 52 can continue operation on a time slice or interrupt driven basis. Therefore, at reset state 104, all units 54, 56, and 58 are disabled and unit 52 is enabled.

Unit 52 ensures that necessary memory and I/O mapping is established before any of units 54, 56, and 58 is activated. Further, reset state 104 can be an order for shut down and unit 52 can ensure an orderly shut down of system 10.

Figure 6:
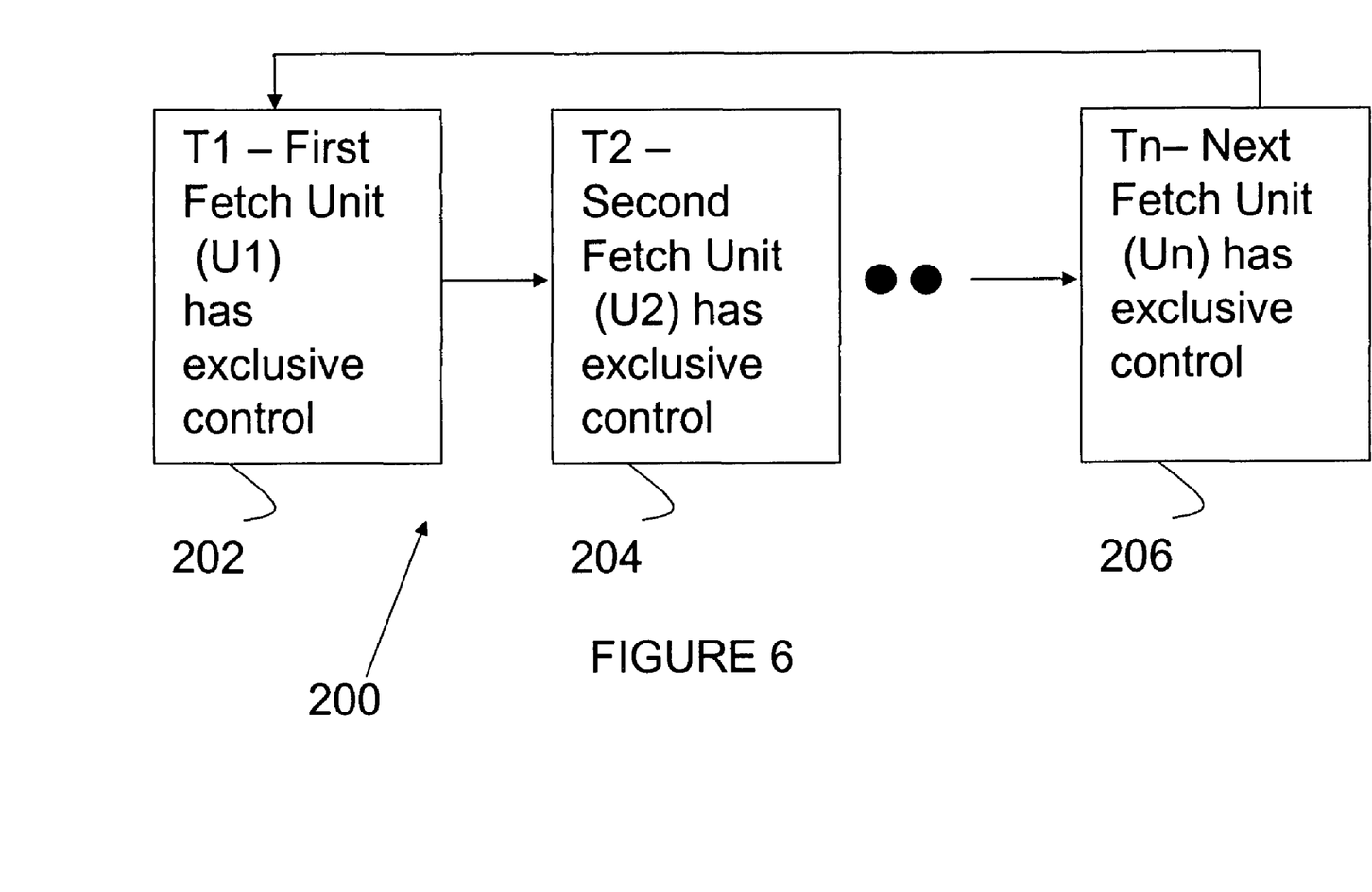
FIG. 6 is a flow diagram showing operation of the computing system illustrated in FIG. 1 on a round-robin basis in accordance with a further exemplary embodiment of the present invention.

With reference to FIG. 6, storage unit 22 can include a portion 82 that is exclusive for unit 54, a portion 84 that is exclusive for unit 56, a portion 86 that is exclusive for unit 56, and a portion 88 that is exclusive for unit 58. Alternatively, portions 84 and 86 can overlap slightly to allow data to be exchanged between the processes executed by units 54, 56, and 58. However, to ensure security, units 54, 56, and 58 are generally not able to access portion 82.

Unit 52 preferably can access any of portions 84, 86, and 88. Unit 52 is responsible for loading of programs as it is the only unit with access to all of the address space associated with memory for storage unit 22.

Correct and complete memory and I/O control are necessary in a high security system. For each of units 54, 56, and 58, unit 52 configures memory mapping from the specific units 54, 56, and 58 memory space to the system physical memory space. When correctly configured, each unit 54, 56, and 58 is allocated an exclusive partition of system memory. Any access attempt by units 54, 56, or 58 outside its allocation can result in immediate suspension of units 54, 56, and 58 and a generation of a supervisor level exception which activates unit 52.

Storage unit 22 and processor 12 can be configured for integrated or separate instruction and data memories, caches, etc. System 10 is not limited to a Harvard or Princeton architecture.

Interprocess input and output communications can be handled in at least two ways. First, in a memory mapped I/O system, the same section of storage unit 22 can be mapped to two different units 54, 56, or 58. According to one embodiment, portions 84, 86, and 88 can be shared between units 54, 56, or 58 or overlap each other. This results in a shared or dual port memory which can be used for communication between two processes operating on units 54, 56, or 58.

Bus I/O unit 66 or storage unit 22 can include a security circuit for protecting portions 82, 84, 86, and 88. If portion 82, 84, 86, and 88 are accessed by an approved unit, an interrupt is provided to unit 52. Unit 52 gains control of processor 12 and shuts down system 10 or otherwise takes corrective actions.

Second, units 54, 56, and 58 can send and receive supervisor calls to communicate information between processes. Execution of a supervisor function call activates unit 52. Unit 52 in turn determines the destination of the call. Unit 52 can either queue a status message for a destination unit 54, 56, or 58 or directly activate unit 54, 56, or 58 for receipt of the message via bus 62 depending upon a priority of the message. External interrupts can be handled in a similar manner. Alternatively, a store/forward instruction could be utilized.

According to another exemplary procedure, one of units 54, 56, or 58 sends a parameter and a message or data. The parameters include sender's process ID, receiver's process ID, priority of the message, etc. When the send message is executed, the message is stored in reserve memory. Receiving unit 52, 54, or 56 checks the reserve memory upon activation and retrieves the data if the reserve memory includes a message for unit 52, 54 or 56.

In another alternative procedure, automatic message communication could be utilized. In this embodiment, part of storage unit 22 or system memory can be allocated as temporary memory for the microcode of processor 12. The allocation would be strictly reserved for this use by processor 12. Processor 12 notifies the appropriate unit 54, 56, or 58 of the message and can provide the message in response to a receive command from unit 54, 56, or 58.

Further, as part of system configuration, external interrupt signals can also be mapped directly to appropriate units 54, 56 and 58 for processing. Upon receipt of a hardware interrupt signal, units 54, 56, or 58 can be activated directly or the interrupt request can be queued for the next activation of the associated unit 52, 54, 56, and 58. In this way, interrupt subroutines can be handled with each USER process.

With reference to FIG. 6, diagram 200 shows the operation of units 54, 56, and 58 in a round-robin order. In each time interval or time slot 202, 204, 206, each of units 54, 56, and 58 has exclusive control of processor 12. In one embodiment, processor 12 operates in a round-robin mode where a fixed time slice is allocated to each unit 54, 56, and 58 in a sequence. When a specific unit 52, 54, or 56 is active, it has exclusive use of units 66 and 64. At the next time slot, the unit stores data associated with unit 66 and unit 64 in registers 63 and is de-activated as the next unit 54, 56, or 58 is activated.

The 14 operational principles discussed above can be met by the architecture of processor 12. Principle 1 can be met by using multiple independent units 54, 56, and 58 associated with each USER process. Principle 2 can be met by using unit 52 and unit 66 upon powering or reset. Principle 3 is performed by unit 52. Unit 52 can have a set of privileged instructions to load program counters in units 52, 54, 56, or 58.

Principle 4 can be performed through unit 52, microcode or by allocation of overlapping memory in unit 22. Principle 5 can be achieved by a round-robin mode in which can unit 52, 54, 56, or 58 is allocated an execution time of one instruction period. Alternative modes, such as burst modes, can allow multiple instruction periods or a fixed execution time. Principle 5 can be achieved by unit 52 at start-up as part of a software routine which configures scheduling.

Principle 6 is achieved by unit 52 at start-up through a software routine. The software routing should be reviewed to ensure integrity, reliability, and security. Principle 7 is achieved through unit 52 and bus 62. Principle 8 is achieved by units 54, 56, and 58. Principle 9 is achieved by unit 52. The software executed by unit 52 should be reviewed to ensure integrity, reliability, and security. Principle 10 can be achieved by I/O unit 66. I/O unit 66 can be configured to provide a memory access exception for out-of-bounds errors, etc.

Principle 11 is achieved by unit 52 establishing address space for each of units 54, 56, and 58. Principle 12 is achieved by allowing each of units 54, 56, and 58 to exit its process. Upon exit, unit 52 is notified. Processing resource allocated for unit 54, 56, or 58 that exited can be reallocated by unit 52. Further, unit 52 can allocate unit 54, 56 or 58 that exited to a different USER process.

Principle 13 is achieved by unit 52 signaling via bus 62 that each of units 54, 56, and 58 are being shut down. Generally, unit 52 is the first to be notified of impending shut downs. Unit 52 shuts down units 54-58 in the approximately 100-500 ms shutdown period, thereby globally interrupting all USER processes.

Principle 14 can be achieved by configuring unit 52 to receive exception signals (e.g., memory faults) associated with units 54, 56, and 58. Unit 52 can execute exception routines in response to the exception signals.

Applicants note that the operational principles can be implemented through various hardware and software methodologies and structures. For example, the hardware associated with units 52, 54, 56 and 58 can be combined with software structure including microcode structure to achieve operational principles 1-14. Alternatively, programmable logic, hardwired circuits, etc., can be utilized to implement structures necessary for achieving operational principles 1-14.

It is understood that while the detailed descriptions, specific examples, specific hardware, and routines discussed provide preferred exemplary embodiments of the present invention, that preferred exemplary embodiments are for the purpose of illustration only. For example, although 13 operational principles are discussed, the present invention may utilize less than all 13 operational principles. The method and system of the present invention are not limited to the precise details and conditions disclosed. Various changes will be made to the details without departing from the scope of the invention, which is defined by the following claims. Single lines in the drawings can indicate one or multiple conductors.

What is claimed is:

1. A computing system optimized for high security, reliability or integrity, comprising:
   a multiple instruction stream, single data stream processor including a master instruction processing unit, a plurality of fetch instruction processing units, a single bus interface/memory unit, and a single data processing unit; and
   a storage unit, wherein the fetch instruction processing units each include a program counter, interrupt processing registers, status registers, an accumulator, and temporary data registers.

2. The computing system of claim 1, wherein each of the plurality of fetch instruction processing units, wherein the fetch instruction processing units, the master processing unit, the single bus interface/memory unit, and the single data processing unit are coupled to a single bi-directional data bus.

3. The computing system of claim 1, wherein the multiple instruction stream, single data stream processor is implemented in a single integrated circuit package.

4. The computing system of claim 1, wherein the multiple instruction stream, single data stream processor executes avionics software.

5. The computing system of claim 1, wherein the multiple instruction stream, single data stream processor executes financial or national security software.

6. The computing system of claim 1, wherein the master instruction processing unit establishes allocation of system memory in the storage unit among the plurality of fetch instruction processing units.

7. The computing system of claim 1, wherein the master instruction processing unit obtains control after a reset or interrupt.

8. The computing system of claim 7, wherein the master instruction processing unit begins execution at system reset and configures the computing system for the plurality of fetch instruction processing units.

9. The computing system of claim 8, wherein the master instruction processing unit has the greatest access to system resources.

10. The computing system of claim 9, wherein the master instruction processing unit operates according to DO-178B, level A guidelines.

11. An apparatus for use in a computing system optimized for high security, reliability or integrity, the apparatus comprising:
- a supervisor fetch unit;
- a plurality of fetch instruction processing units, wherein the fetch instruction processing units each include a program counter, interrupt processing registers, status registers, an accummulator, and temporary data registers;
- a single bus interface/memory unit; and
- a single data processing unit.

12. The apparatus of claim 11, wherein the supervisor fetch unit configures a memory for the plurality of fetch instruction processing units registers, wherein the fetch instruction processing units, the supervisor processing unit, the single bus interface/memory unit, and the single data processing unit are coupled to a single bi-directional data bus.

13. The apparatus of claim 11, wherein the plurality of fetch instruction processing units operate in round robin order according to a schedule controlled by the supervisor processing unit.

14. The apparatus of claim 11, wherein the supervisor fetch unit obtains control in response to a reset or interrupt.

15. The apparatus of claim 14, wherein the supervisor fetch unit maps memory for each of the fetch instruction processing units.

16. The apparatus of claim 11, wherein an access to a memory by a selected fetch instruction processing unit outside of a selected range results in a suspension of the operation of the selected fetch instruction processing unit and generation of a supervisor level exception, the supervisor level exception activating the supervisor fetch unit.

17. A method of operating a computing system, the method comprising:
- configuring a memory with a supervisory fetch unit, the memory being configured so that a first fetch instruction unit has access to a selected range in the memory and a second instruction fetch unit has access to a second range in the memory, wherein the fetch instruction units each include a program counter, interrupt processing registers, status registers, an accummulator, and temporary data registers;
- fetching a first instruction with the first fetch instruction unit in a first time slot;
- performing the first instruction using a single bus interface/memory unit and/or a single data processing unit in the first time slot;
- fetching a second instruction in a second time slot with the second instruction fetch unit; and
- performing the instruction using the single bus interface/memory unit and/or the single data processing unit in the second time slot.

18. The method of claim 17, further comprising transferring control to the supervisor fetch unit in response to an interrupt.

19. The method of claim 17, further comprising storing data in each of the fetch instruction processing units in response to an interrupt.

20. The method of claim 17, wherein the first range of the memory and the second range of the memory overlap and wherein the single bus interface/memory unit and the single data processing unit being coupled with the first instruction fetch unit by a first bus wherein the second instruction fetch unit is coupled to the first bus.

* * * * *